(12) United States Patent
Jules et al.

(10) Patent No.: US 10,166,674 B1
(45) Date of Patent: Jan. 1, 2019

(54) ADAPTING PROGRAMMING OF A ROBOT AND/OR CONTROL OF THE ROBOT BASED ON ONE OR MORE PARAMETERS OF AN END EFFECTOR OF THE ROBOT

(71) Applicant: X Development LLC, Mountain View, CA (US)

(72) Inventors: Anthony Sean Jules, Oakland, CA (US); Johan Ulrich Lewin Jessen, Mountain View, CA (US); Benjamin M. Davis, San Francisco, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 43 days.

(21) Appl. No.: 15/599,221

(22) Filed: May 18, 2017

Related U.S. Application Data

(63) Continuation of application No. 14/723,349, filed on May 27, 2015, now Pat. No. 9,687,982.

(51) Int. Cl.
*B25J 9/16* (2006.01)

(52) U.S. Cl.
CPC .............. *B25J 9/1612* (2013.01); *B25J 9/161* (2013.01)

(58) Field of Classification Search
CPC ........ B25J 9/1612; B25J 9/161; B25J 9/1615; B25J 9/1653; B25J 9/1674; B25J 9/1694; B25J 11/00; B25J 15/0052; B25J 15/0061; B25J 15/04; B25J 15/0408; B25J 15/0483

See application file for complete search history.

(56) References Cited

U.S. PATENT DOCUMENTS

| | | |
|---|---|---|
| 4,620,362 A | 11/1986 | Reynolds |
| 4,809,426 A | 3/1989 | Takeuchi et al. |
| 5,297,238 A | 3/1994 | Wang et al. |
| 5,495,410 A | 2/1996 | Graf |
| 5,771,553 A | 6/1998 | Sim et al. |
| 5,943,240 A | 8/1999 | Nakamura |
| 6,072,146 A | 6/2000 | Matuschek et al. |
| 6,256,868 B1 | 7/2001 | Sugito et al. |
| 6,292,715 B1 | 9/2001 | Rongo |
| 6,360,136 B1 | 3/2002 | Lamers |
| 7,027,893 B2 | 4/2006 | Perry et al. |
| 7,558,647 B2 | 7/2009 | Okazaki |
| 7,872,436 B2 | 1/2011 | Kock et al. |
| 7,890,194 B2 | 2/2011 | Panesse |

(Continued)

FOREIGN PATENT DOCUMENTS

EP          1724676        11/2006

*Primary Examiner* — Nicholas Kiswanto
(74) *Attorney, Agent, or Firm* — Middleton Reutlinger

(57) ABSTRACT

Methods and apparatus that adapt programming and/or control of a robot. The robot has at least one attachment area that can removably couple with any one of a plurality of end effectors. The programming and/or control is adapted based on received parameters of an end effector attached (or to be attached) to the attachment area of the robot. Some implementations are directed to adapting graphical user interface output of a robot programming application based on one or more parameters of an end effector for a robot being programmed via the robot programming application. Some implementations are directed to adapting control of a robot based on one or more parameters of an end effector attached (or to be attached) to the robot.

15 Claims, 14 Drawing Sheets

(56) References Cited

U.S. PATENT DOCUMENTS

| | | |
|---|---|---|
| 8,423,182 B2 | 4/2013 | Robinson et al. |
| 8,738,181 B2 | 5/2014 | Greer et al. |
| 8,761,932 B2 | 6/2014 | Lapham |
| 8,779,715 B2 | 7/2014 | Kassow et al. |
| 8,868,241 B2 | 10/2014 | Hart et al. |
| 9,272,423 B2 | 3/2016 | Gordon et al. |
| 2007/0135933 A1 | 6/2007 | Panesse et al. |
| 2007/0294662 A1 | 12/2007 | Kim et al. |
| 2008/0040911 A1 | 2/2008 | De Koning |
| 2009/0044655 A1* | 2/2009 | DeLouis ............... B25J 15/04 74/490.05 |
| 2009/0271036 A1 | 10/2009 | Kock et al. |
| 2010/0180711 A1* | 7/2010 | Kilibarda ............. B05C 5/0216 74/490.06 |
| 2012/0123590 A1 | 5/2012 | Halsmer |
| 2015/0098787 A1 | 4/2015 | Ou et al. |
| 2015/0100161 A1* | 4/2015 | Malackowski ........ A61B 34/30 700/258 |
| 2015/0120041 A1* | 4/2015 | Wise .................. B25J 19/0095 700/245 |
| 2015/0283707 A1 | 10/2015 | Holecek et al. |
| 2016/0176043 A1* | 6/2016 | Mishra ............... B25J 15/0466 700/248 |
| 2016/0327934 A1* | 11/2016 | Morimoto ............ B25J 9/1653 |
| 2018/0154521 A1* | 6/2018 | Bosscher ............. B25J 9/1664 |

* cited by examiner

ADAPTING PROGRAMMING OF A ROBOT AND/OR CONTROL OF THE ROBOT BASED ON ONE OR MORE PARAMETERS OF AN END EFFECTOR OF THE ROBOT

BACKGROUND

Robots may be programmed to perform one or more of a variety of tasks in various environments. Many robots are programmed to utilize one or more end effectors to act upon one or more objects. For example, a robot may utilize a gripper end effector to pick up an object from a first location, move the object to a second location, and drop off the object at the second location. Some additional examples of robot end effectors include nozzle end effectors, suction-based end effectors, magnetic end effectors, hybrid suction/friction end effectors, and material removal end effectors (e.g., drilling tools, laser cutters), to name just a few.

SUMMARY

This specification is directed generally to methods and apparatus that adapt programming of a robot and/or control of the robot based on received parameters of an end effector attached (or to be attached) to the robot. The robot may have at least one attachment area that can removably couple with, and provide control commands to, any one of a plurality of end effectors. For example, any one of a first gripper, a second gripper, and a third gripper may be coupled to the end effector attachment area and controlled by the robot.

Some implementations are generally directed to adapting graphical user interface output of a robot programming application based on one or more parameters of an end effector for a robot being programmed via the robot programming application. For example, the robot programming application may receive an indication of the end effector for which a robot is to be programmed in the robot programming application. The robot programming application may further identify one or more parameters defined for the indicated end effector and provide graphical user interface output that is based on one or more of the identified parameters. For instance, programming options that are presented for selection by the user via a graphical user interface may be determined based on one or more of the parameters; restrictions on programming input for the robot may be determined based on one or more of the parameters and communicated to the user via the graphical user interface; and/or one or more graphical representations of the end effector may be presented to the user via the graphical user interface based on one or more of the parameters.

Some implementations are generally directed to adapting control of a robot based on one or more parameters of an end effector attached (or to be attached) to the robot. For example, a robot programming application (e.g., as described above) may generate robot control output based on programming input provided to the programming application by a user and based on one or more parameters of the end effector. The robot control output may be provided to the robot and utilized by the robot in generating control commands to provide to one or more actuators of the robot and/or other operational components of the robot. Also, for example, a robot may identify an end effector attached to the robot, receive one or more parameters defined for the end effector, and generate one or more control commands to provide to one or more actuators and/or other operational components of the robot based on at least one of the parameters received from the end effector.

In some implementations, a method is provided that comprises receiving, by a robot programming application, an indication of an end effector of a robot for which the robot is to be programmed by a user in the programming application. The end effector is one of multiple end effectors that can be attached to and detached from an end effector attachment area of the robot. The method further comprises identifying, by the programming application and based on the indication, one or more parameters defined for the end effector. The parameters comprise an action parameter that defines one or more actions performable by the end effector. The method further comprises providing, by the programming application and based on the action parameter, the one or more actions for presentation to the user as selectable actions in programming the robot.

This method and other implementations of technology disclosed herein may each optionally comprise one or more of the following features.

In some implementations, identifying the parameters defined for the end effector comprises receiving the parameters from the robot following receipt by the robot of the parameters from the end effector. In some of those implementations, receiving the indication comprises receiving, from the robot, a data packet that comprises the parameters.

In some implementations, the method further comprises: receiving, by the robot, the parameters from the end effector when the end effector is attached to the end effector attachment area of the robot; and transmitting, by the robot, the indication and the parameters to the programming application. In those implementations identifying the parameters comprises receiving the parameters transmitted by the robot.

In some implementations, the indication of the end effector comprises a unique identifier of the end effector and identifying the parameters comprises selecting the parameters based on a mapping between the parameters and the unique identifier. In some of those implementations, receiving the indication of the end effector comprises receiving the unique identifier from the robot following receipt, by the robot, of the unique identifier from the end effector. In other implementations, receiving the indication of the end effector comprises receiving input provided by the user via the programming application. In some implementations the end effector is manually adjustable to a plurality of hardware configurations and the unique identifier of the end effector identifies a current hardware configuration of the plurality of hardware configurations of the end effector.

In some implementations, the parameters further comprise one or more of a mass parameter, a center of mass parameter, and an inertia parameter. In some of those implementations, the method further comprises: receiving, by the programming application, programming input from the user; and generating, based on the programming input and at least one of the mass parameter, the center of mass parameter, and the inertia parameter, one or more control commands to control the robot.

In some implementations, the parameters further comprise one or more interaction object parameters defining one or more properties of objects that can be interacted with by the end effector. In some of those implementations, the method further comprises: preventing, by the programming application, programming input from being defined for the robot that causes interaction of the end effector with an object that does not conform to the interaction object parameters.

In some implementations, the end effector is actuable between at least a first state and a second state, and the parameters further comprise a first three dimensional representation of the end effector in the first state and a second three dimensional representation of the end effector in the second state. In some of those implementations, the method further comprises: providing, by the programming application at a first time, the three dimensional representation of the end effector in the first state for presentation to the user; and providing, by the programming application at a second time, the three dimensional representation of the end effector in the second state for presentation to the user.

In some implementations, a method is provided that comprises identifying, by a robot, an end effector attached to the robot. The end effector is one of multiple end effectors that can be attached to and detached from an end effector attachment area of the robot. The method further comprises receiving, by the robot from the end effector, one or more physical property parameters defined for the end effector. The physical property parameters define one or more physical properties of the end effector. The method further comprises generating, by the robot, one or more control commands to provide to one or more actuators of the robot. The control commands are generated based on at least one of the physical property parameters received from the end effector.

This method and other implementations of technology disclosed herein may each optionally include one or more of the following features.

In some implementations, determining a given control command of the control commands comprises applying a given physical property parameter of the physical property parameters as a value for a variable utilized in generating the given control command.

In some implementations, the physical property parameters comprise one or more of a mass parameter, a center of mass parameter, and an inertia parameter.

In some implementations, the physical property parameters comprise an action location parameter defining at least one reference point for positioning the end effector relative to an object to be acted upon by the end effector. In some of those implementations, generating the one or more control commands comprises: determining a path of the end effector based on the action location parameter, the path determined to position the reference point of the end effector at a particular location at the end of the path; and generating the one or more control commands to move the end effector along the path.

In some implementations, the end effector is a gripper and the physical property parameters comprise an action location parameter that defines at least one reference point for positioning the gripper relative to an object to be acted upon by the gripper. In some of those implementations, generating the one or more control commands to provide to one or more motors of the robot comprises determining at least one of the control commands to position the gripper based on the action location parameter.

In some implementations, the end effector is manually adjustable to a plurality of hardware configurations and the at least one of the physical property parameters on which the control commands are based are particularized to a current hardware configuration of the plurality of hardware configurations. In some of those implementations, the method further comprises: identifying, by the robot, the current hardware configuration of the end effector; and selecting a subset of the physical property parameters defined for the end effector based on the current hardware configuration of the end effector. The subset comprises the at least one of the physical property parameters on which the control commands are based and generating the control commands is based on the selected subset of the physical properties parameters. Identifying the current hardware configuration of the end effector may comprise determining the current configuration based on input received by the robot, from the end effector. In some implementations, the input may comprise a plurality of identifiers each corresponding to an appendage of the end effector and selecting the subset of the physical property parameters defined for the end effector based on the current hardware configuration of the end effector comprises: selecting the subset based on a mapping between the identifiers and the physical properties of the subset.

In some implementations, receiving the one or more physical properties defined for the end effector comprises retrieving the physical properties from memory of the end effector via a wired interface connection between the robot and the end effector.

In some implementations, the physical properties comprise geometric bound properties that define the outer bounds of the end effector in at least one state of the end effector. In some of those implementations, generating the control commands comprises determining a path of the end effector based on the outer bounds of the end effector.

Other implementations may include a non-transitory computer readable storage medium storing instructions executable by a processor to perform a method such as one or more of the methods described above. Yet another implementation may include a system of one or more computers and/or one or more robots operable to execute stored instructions to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
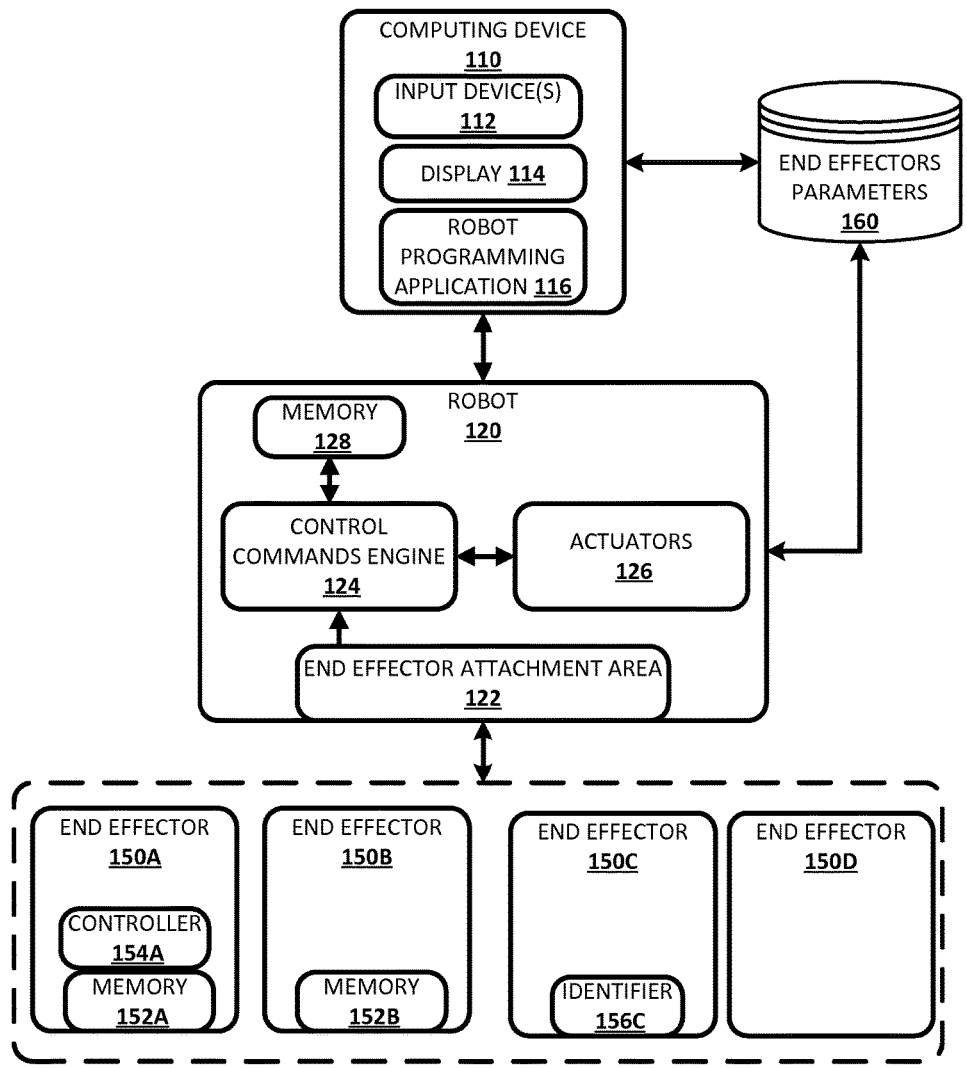
FIG. 1 illustrates an example environment in which programming of a robot and/or control of the robot may be adapted based on received parameters of an end effector for the robot.

Some implementations of the technology described herein are generally directed to adapting one or more parameters of a robot programming application utilized to program a robot based on one or more actions and/or other parameters that are defined for an end effector attached (or to be attached) to the robot. The defined parameters for an end effector may be stored locally on the end effector (e.g., in memory of the end effector) and/or may be accessible via one or more databases that are remote from the end effector. The robot programming application may include, for example, a graphical user interface via which a user may program the robot by defining tasks for the robot. For example, a user may define, via the robot programming application, that a gripper end effector of the robot is to: move to a first area, pick up a first object, move the object along a path to a second area, and place the object in the second area.

As one example, a "gripper" end effector may have one or more defined action parameters each associated with one or more states of the end effector such as "pick up", "rotate", and "drop off" action parameters, and the gripper end effector may be defined as the end effector of a robot being programmed. Based on the defined action parameters, the robot programming application may provide output that presents the "pick up", "rotate", and "drop off" actions as actions that may be selected by the user to define a task for the robot, without presenting options that are not defined for the end effector (e.g., "cut", "spray"). As another example, a gripper end effector may be associated with a first defined action parameter of "pick up round object" that defines one or more first states of the end effector (e.g., actuation of one or more components of the end effector in a first manner) and a second defined action parameter of "pick up rectangular object" that defines one or more second states of the end effector (e.g., actuation of one or more components of the end effector in a second manner). Based on the defined action parameters, the robot programming application may provide output that presents the "pick up round object" and "pick up square object" actions as actions that may be selected by the user to define a task for the robot, and may further adapt a graphical display of the end effector and/or adapt robot control commands to reflect the respective defined state(s) of a selected one of the actions.

As yet another example, a "spraying" end effector (e.g., for painting) may be associated with a first defined action parameter of "targeted spray" that defines one or more first states of the end effector (e.g., actuation of one or more nozzles or other component of the end effector in a first manner) and a second defined action parameter of "broad spray" that defines one or more second states of the end effector (e.g., actuation of one or more nozzles or other component of the end effector in a second manner). Based on the defined action parameters, the robot programming application may provide output that presents the "targeted spray" and "broad spray" actions as actions that may be selected by the user to define a task for the robot, and may further adapt a graphical display of the end effector and/or adapt robot control commands to reflect the respective defined state(s) of a selected one of the actions. As yet another example, a "cutting" end effector (e.g., that includes one or more blades and/or laser-cutters) may be associated with a first defined action parameter of "cut wooden object" that defines one or more first states of the end effector (e.g., rotation of one or more blades of the end effector in a first manner), a second defined action parameter of "cut plastic object" that defines one or more second states of the end effector (e.g., rotation of one or more blades of the end effector in a second manner), and a third defined action parameter of "cut ceramic object" that defines one or more third states of the end effector (e.g., rotation of one or more blades of the end effector in a third manner). Based on the defined action parameters, the robot programming application may provide output that presents those actions as actions that may be selected by the user to define a task for the robot, and may further adapt a graphical display of the end effector and/or adapt robot control commands to reflect the respective defined state(s) of a selected one of the actions.

As another example, parameters may include geometric dimensions and/or a full 3D model of an end effector defined for each of one or more states of the end effector (e.g., an open state and a closed state of a gripper) and the robot programming application may use one or more of those defined parameters to determine paths and/or interaction objects that can be defined for the robot in the programming application. For instance, the robot programming application may utilize the geometric dimensions to prevent the user from defining a path that would undesirably contact an environmental object and/or may utilize the dimensions for an open state of the end effector to prevent the user from defining that the end effector pick up an object that would not fit within the grasp of the end effector.

As yet another example, the parameters may define one or more limits of the end effector such as a maximum grip force of a gripper end effector—and the robot programming application may utilize the end effector limit(s) to determine the types of objects that the end effector can be programmed to "pick up" via the robot programming application. As yet another example, one or more of the parameters may define limits on the types of objects that can be acted on by the end effector such as maximum/minimum weights and/or dimensions that can be acted upon, types of materials that can be acted upon, etc.—and the robot programming application may utilize the object limit(s) to determine the types of objects that the end effector can be programmed to act upon in the programming application. As yet another example, an action location parameter of a gripper end effector may define at least one reference point for positioning the gripper relative to an object to be picked up, and the robot programming application may utilize the action location parameter to generate graphical user interface output that displays the reference point and/or to determine the position(s) and orientation(s) that may be selected for the gripper end effector to "pick up" an object in the robot programming application. Further examples of adapting one or more parameters of a robot programming application utilized to program a robot based on one or more parameters defined for an end effector are described herein.

Some implementations of the technology described herein are generally directed to adapting control of a robot based on one or more parameters of an end effector attached (or to be attached) to the robot. For example, a robot programming application (e.g., as described above) may generate robot control output based on programming input provided by a user and based on one or more parameters of the end effector. The robot control output may be provided to the robot and utilized by the robot in generating control commands to provide to one or more motors of the robot. Also, for example, a robot may identify an end effector attached to the robot, receive one or more parameters defined for the end effector, and generate one or more control commands to provide to one or more actuators of the robot based on at least one of the parameters received from the end effector. For instance, the robot may utilize a mass parameter and/or center of mass parameter of the end effector as a value for a control command variable utilized in generating a control command to provide to one or more motors and/or other operational components of the robot. Further examples of adapting control of a robot based on one or more parameters of an end effector are described herein.

FIG. 1 illustrates an example environment in which programming of a robot 120 and/or control of the robot 120 may be adapted based on received parameters of an end effector for the robot 120. The example environment includes a computing device 110 that includes a robot programming application 116, one or more input devices 112, and one or more display devices 114. The computing device 110 may be, for example, a desktop computing device or a tablet computing device and may include one or more components not explicitly illustrated in FIG. 1 such as a microprocessor, memory, etc. In some implementations, the computing device 110 may share one or more aspects in common with the example computing device 810 illustrated in FIG. 8 and described in more detail herein. In some implementations, the computing device 110 may include multiple computing devices in communication with one another. For example, one or more aspects of the robot programming application 116 may be implemented on one or more "cloud" computing devices and the input device(s) 112 and/or display 114 may be on a separate computing device in communication with the one or more cloud computing devices. For instance, the input device(s) 112 and/or display 114 may be integral parts of a tablet computing device or peripherals in communication with a desktop computing device.

The computing device 110 is in communication with the robot 120. The computing device 110 may be in communication with the robot 120 via a direct communication line or through one or more networks such as a local area network (LAN) or wide area network (WAN) (e.g., the Internet).

The robot 120 includes a control commands engine 124, one or more actuators 126 (e.g., servo motors), and memory 128. The memory 128 includes control command instructions that, when executed by the control commands engine 124, cause the control commands engine 124 to generate control commands and provide the control commands to one or more of the actuators 126 to effectuate movement of one or more components of the robot. For example, the robot 120 may have multiple degrees of freedom and each of the actuators 126 may control actuation of the robot 120 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The control commands engine 124 may be implemented in one or more processors, field-programmable gate arrays ("FPGA"), application-specific integrated circuits ("ASIC"), and/or other controllers of the robot 120. In some implementations, the robot 120 may comprise a "brain box" that may include all or aspects of the control commands engine 124. For example, the brain box may provide real time bursts of data to the actuators 126, with each of the real time bursts comprising a set of one or more control commands that dictate, inter alia, the parameters of motion (if any) for each of one or more of the actuators 126. Additional control commands may be included in the real time bursts such as control commands that dictate the state of the end effector (e.g., dictate movement of a motor of a gripper to "close" the gripper, dictate whether a magnetic end effector is magnetized and/or to what degree it is magnetized, dictate whether a suction end effector is applying suction and/or to what degree). Also, for example, additional control commands may dictate motion or propulsion of other operational components of a robot, functionality of sensor(s) of the robot, etc.

As described herein, in some implementations all or aspects of the control command instructions in memory 128 may be provided to the robot 120 by robot programming application 116 and may be based on user input provided to the robot programming application 116 in programming of the robot 120 via the robot programming application 116. As also described herein, in some of those and/or other implementations, the control command instructions in memory 128 may include one or more variables related to physical property parameters of an end effector and the control commands engine 124 may use physical property parameters of an attached end effector as values for those variables in generating control commands.

Robot 120 may take various forms, including but not limited to a robot arm form (e.g., one similar to robot 420 illustrated in FIGS. 4A-4D and described below), a humanoid form, an animal form, a wheeled device, a submersible vehicle, an unmanned aerial vehicle ("UAV"), and so forth. In various implementations, control commands engine 124 and/or other component(s) of the robot 120 may be operably coupled with one or more one or more sensors and may receive input from the sensors that affects one or more of the control commands generated by the control commands engine 124. Sensors may take various forms, including but not limited to light sensors, pressure sensors, pressure wave sensors (e.g., microphones), proximity sensors, accelerometers, gyroscopes, thermometers, barometers, and so forth. Any sensor may be integral with the robot 120 and/or may be located external to robot 120, e.g., as standalone units.

Although control commands engine 124 is illustrated in FIG. 1 as an integral part of the robot 120, in some implementations, all or aspects of the control commands engine 124 may be implemented in a component that is separate from, but in communication with, robot 120. For example, all or aspects of control commands engine 124 may be implemented on one or more computing devices that are in wired and/or wireless communication with the robot 120 and that share one or more similarities with the example computing device 810 illustrated in FIG. 8.

The robot 120 of FIG. 1 also includes an end effector attachment area 122 that enables removable attachment of any one of multiple end effectors such as end effectors 150A-D of FIG. 1. In other words, any one of the end effector 150A-D of FIG. 1 can be attached to the end effector attachment area 122 and detached from the end effector attachment area 122. The end effector attachment area 122 may take various forms such as a female or male connector that engages with a corresponding male or female connector of the end effectors 150A-D. Moreover, various structures may optionally be provided for further securing one of the end effectors 150A-D to the end effector attachment area 122 such as clasps, one or more threaded connections, screws, etc. The electrical connection(s) between the end effector attachment area 122 and a given end effector may include a power connection to provide power from the robot 120 to the end effector and/or one or more data connections to enable the robot to send control commands that dictate the state of the end effector and/or receive feedback or other data from the end effector. The control commands provided by the robot 120 to the given end effector over the data connection(s) may range from relatively simple commands (e.g., "open gripper" or "close gripper") to more complex commands (e.g., "close gripper with X pounds of force until gripper sensor measures X pounds of resistance), depending on the complexity of the control commands and/or the end effector.

The example environment of FIG. 1 also includes four example end effectors 150A-D. The end effectors 150A-D may include, for example, one or more gripper end effectors (e.g., an "impactive" gripper or "ingressive" gripper (e.g., physically penetrating an object using pins, needles, etc.)), one or more "astrictive" end effectors (e.g., using suction or vacuum to pick up an object), one or more "contiguitive" end effectors (e.g., using surface tension, freezing or adhesive to pick up an object), drills, brushes, force-torque sensors, cutting tools, deburring tools, welding torches, and so forth.

The end effector 150A includes a controller 154A and memory 152A. The memory 152A stores parameters of the end effector 150A. The controller 154A may transmit the parameters stored in the memory 152A to the robot 120 via a communication connection. For example, the controller 154A may, after connection of the end effector 150A to the end effector attachment area 122, transmit the parameters via one or more wired data connections between the robot 120 and the end effector 150A (e.g., wired data connections formed via coupling of the end effector 150A to the end effector attachment area 122). The robot 120 may utilize the parameters to generate control commands as described herein and/or may forward the parameters to the computing device 110 for use by the robot programming application 116 as described herein.

In some implementations, the controller 154A may send the parameters in a data packet that includes (e.g., starts with) one or more data segments that identify the packet as a data packet that includes end effector parameters. The controller 154A may automatically transmit the parameters in response to attachment to the robot 120 (e.g., in response to receiving power from the robot 120 via attachment to end effector attachment area 122) or may wait for a data packet to be received from the robot 120 that indicates the robot is requesting end effector parameters. The controller 154A may optionally perform additional end effector related functions such as interpreting control commands received from the robot 120 and controlling one or more motors or other actuators of the end effector 150A based on the received control commands.

The end effector 150B includes memory 152B that stores parameters of the end effector 150B. The robot 120 may access the memory 152B via a wired communication connection between the robot 120 and the end effector 150B after the end effector 150B is attached to the end effector attachment area 122. For example, robot 120 may access the memory 152B in response to detecting the end effector 150B has been attached and receive the parameters from the memory 152B. The robot 120 may utilize the parameters to generate control commands as described herein and/or may forward the parameters to the computing device 110 for use by the robot programming application 116 as described herein.

The end effector 150C includes an end effector identifier 156C, but does not include memory storing the parameters. In some implementations, the identifier is stored in memory of the end effector 150C and may be received by the robot 120 in a manner such as those described with respect to receiving the parameters from the end effector 150A and/or 150B. In some implementations, the identifier 156C is embedded in a radio-frequency identification (RFID) tag or transmitter that is read by an RFID receiver of the robot 120. In some implementations, the identifier 156C includes a barcode, quick response (QR) code, serial number, or other visual identifier on an exterior surface of the end effector 150C that may be read by a camera or other optical device of the robot 120.

Regardless of the form of the identifier 156C, in some implementations the robot 120 determines the identifier and utilizes the identifier 156C to locate parameters mapped to the identifier in end effectors parameters database 160. The end effectors parameters database 160 may be located remote from the robot 120 and/or may be stored locally at the robot 120. The robot 120 may forward the located parameters to computing device 110 in some implementations. In some implementations where the robot 120 determines the identifier 156C, it forwards the identifier to computing device 110 and the computing device 110 may use the identifier to locate parameters mapped to the identifier in end effectors parameters database 160. The end effectors parameters database 160 may be located remote from the computing device 110 and/or may be stored locally at the computing device 110. In some implementations, the computing device 110 may read the identifier 156C directly (e.g., via an RFID reader or camera) or a user may input the identifier 156C to the computing device 110 using input device(s) 112 (e.g., when the identifier 156C is a serial number). The robot 120 and/or the computing device 110 may utilize the parameters for one or more purposes such as those described herein.

The end effector 150D does not include the identifier or the parameters. In some implementations, the robot 120 may utilize one or more cameras and/or other sensors to determine external features of the end effector 150D and use the features to locate parameters mapped to the features in end effectors parameters database 160. For example, the robot 120 may include a camera and an image processing engine that processes images taken by the camera and extracts one or more features from the images. The camera may be utilized to take one or more images of the end effector 150D, optionally after moving the end effector 150D to a desired position relative to the camera, and feature(s) extracted from the images by the image processing engine. The robot 120 may utilize one or more of those features to locate parameters mapped to the features in end effectors parameters database 160. In some implementations, the computing device 110 may likewise utilize one or more cameras and/or other sensors to determine external features of the end effector 150D and use the features to locate parameters mapped to the features in end effectors parameters database 160. In some implementations, a user may utilize computing device 110 to select, from images of a plurality of end effectors, an end effector that matches the end effector 150D. The computing device 110 may utilize an identifier associated with the selection to locate parameters mapped to the identifier in end effectors parameters database 160. The located parameters may be utilized by the robot programming application 116 and/or forwarded to the robot 120 for use by the control commands engine 124.

Turning now to FIGS. 2A-4D, additional description is provided of examples of adapting graphical user interface output and robot control output of the robot programming application 116 based on one or more parameters of an end effector.

Figure 2A:
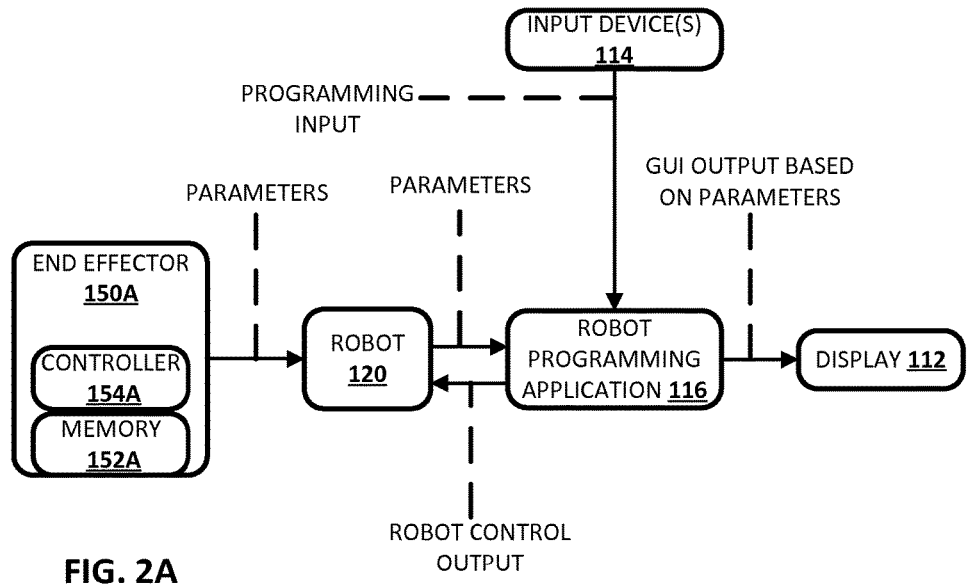
FIGS. 2A, 2B, and 2C each illustrate an example of adapting graphical user interface output and robot control output of a robot programming application based on one or more parameters of an end effector for a robot being programmed via the robot programming application.

In FIG. 2A, robot 120 receives parameters from end effector 150A. For example, the robot 120 may receive the parameters over one or more data connections in response to attachment of the end effector 150A to the robot 120. The robot 120 provides the parameters to robot programming application 116 along with an indication that the parameters are for an end effector attached to the robot 120. In some implementations, the indication may be receiving, from the robot 120, a data packet that includes the parameters. In some of those implementations, the indication may be based on the data packet including (e.g., starting with) one or more data segments that identify the packet as a data packet that includes end effector parameters.

The robot programming application 116 generates graphical user interface (GUI) output based on one or more of the received parameters and provides the output to display 112 for presentation to the user. For example, a "gripper" end effector may have defined action parameters of "pick up" and "drop off" and may also have one or more interaction object parameters that define weights, shapes, and/or materials of objects that can be acted upon by the gripper end effector. Based on those parameters, the robot programming application 116 may provide GUI output that enables "pick up" and/or "drop off" actions to be defined (to the exclusion of any other parameters) and only enables those actions to be defined with respect to interaction objects defined in the GUI that satisfy the interaction object parameters. In some implementations, the generated GUI output may also be based on programming input received from the input device(s) 114. For example, the GUI output that enables "pick up" and/or "drop off" actions to be defined may be provided in response to programming input indicating a user desire to define a new action. Programming input may include, for example, selection of one or more buttons or other graphical symbols via the GUI (e.g., via a mouse), typed input, spoken input, etc.

Once the user has indicated completion of the programming of the robot 120 via the robot programming application 116, the robot programming application 116 generates robot control output and provides the robot control output to the robot 120. The robot 120 may store the received robot control output in memory 128 and utilize it in generating control commands to provide to one or more actuators 126 and/or other operational components (e.g., the end effector 150A) of the robot 120. The robot control output generated by the robot programming application 116 is based on the programming input received from the user via the input device(s) 114, one or more parameters of the end effector, and/or other factors.

In some implementations, the one or more parameters of the end effector on which the robot control output is based may include one or more parameters that are in addition to those utilized to adapt the GUI output. For example, the parameters for the end effector 150A may include a mass parameter, a center of mass parameter, an inertia parameter, and/or other physical property parameters and the robot control output may be generated in view of one or more of those parameters. For example, programming input may dictate that the end effector is to move along a path at a certain speed and the robot control output may include one or more control commands that dictate the movement of one or more actuators 126 of the robot 120 at each of a plurality of time periods to achieve that certain speed and maintain the path in view of the physical properties of the end effector 150A (e.g., moving a 1 kg end effector at the speed and maintaining the path may require different control commands than moving a 4 kg end effector).

Figure 2B:
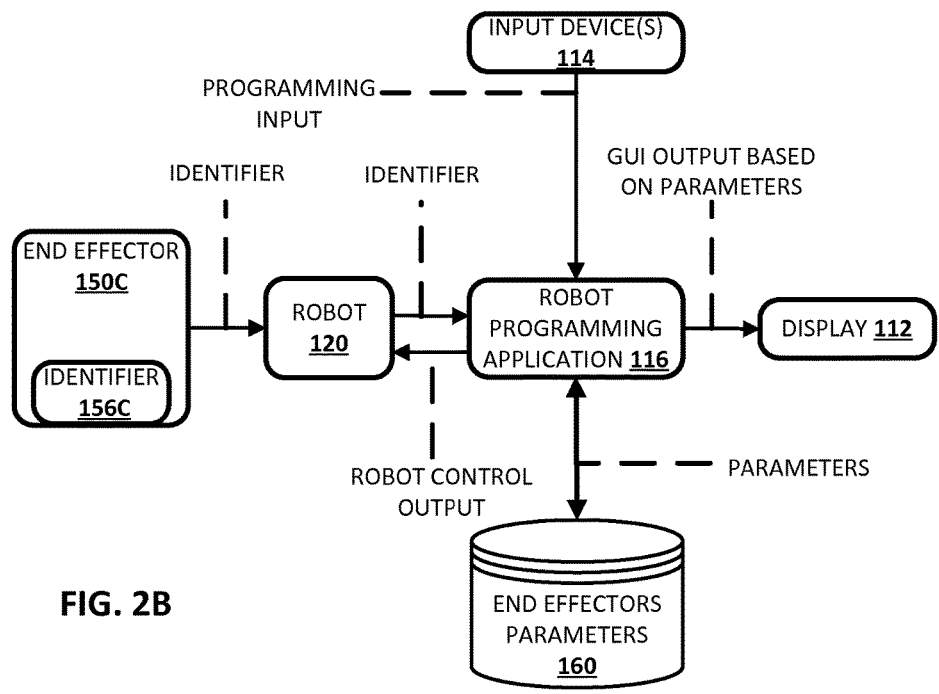

In FIG. 2B, robot 120 receives identifier 156C from end effector 150C, but does not receive parameters from the end effector 150C. The robot 120 provides the identifier 156C to robot programming application 116 and the robot programming application 116 utilizes the identifier 156C to determine, from end effectors parameters database 160, parameters that are mapped to the identifier 156C. As with FIG. 2A, the robot programming application 116 generates GUI output based on one or more of the received parameters, and optionally programming input from the input device(s) 114, and provides the output to display 112 for presentation to the user. Once the user has indicated completion of the programming of the robot 120 via the robot programming application 116, the robot programming application 116 generates robot control output and provides the robot control output to the robot 120. The robot control output generated by the robot programming application 116 is based on the programming input received from the user via the input device(s) 114, one or more parameters of the end effector, and/or other factors.

Figure 2C:
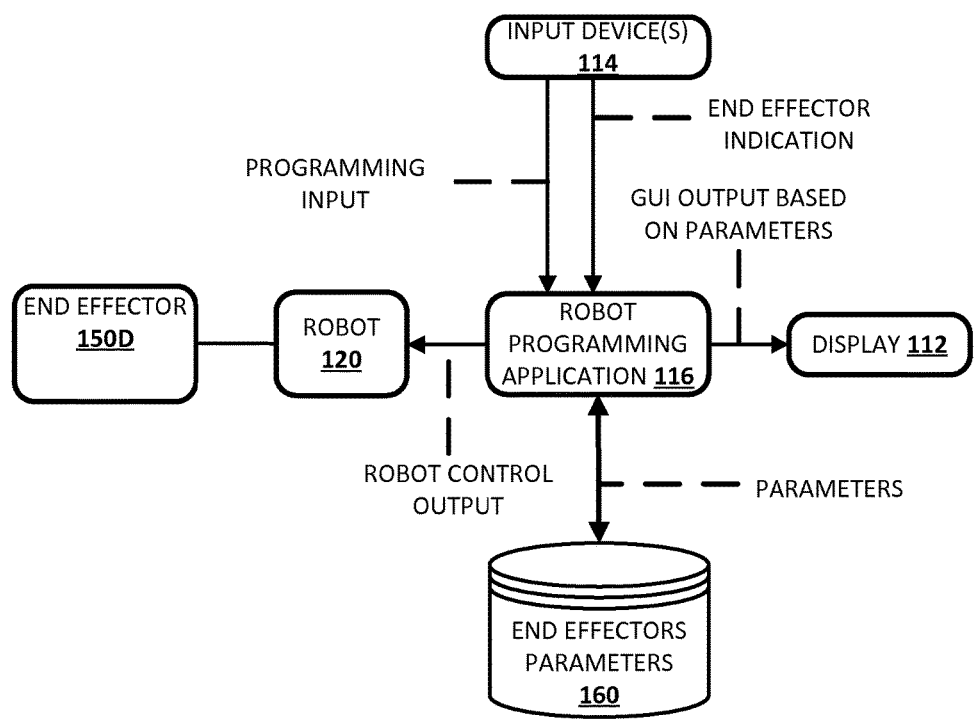

In FIG. 2C, end effector 150D is attached to robot 120, but robot 120 does not receive an identifier or parameters from the end effector 150D. Rather, the user provides an end effector indication via one of the input device(s) 114. For example, the robot programming application 116 may provide a GUI for presentation to the user via display 112 that presents the user with images and/or descriptors of various end effectors to enable the user to locate an indication of the end effector 150D and provide input to the robot programming application indicating that is the end effector to be programmed for the robot 120. For example, the robot programming application may enable the user to select one or more categories of end effectors (e.g., "grippers", "claw grippers", categories of end effector "manufacturers") to identify a subset of end effectors, then present images of end effectors of the subset. The user may then select the image that corresponds to the end effector 150D. The robot programming application 116 utilizes the selected image (e.g., an identifier of the selected image) to determine, from end effectors parameters database 160, parameters that are mapped to the selected image.

As with FIGS. 2A and 2B, the robot programming application 116 generates GUI output based on one or more of the received parameters (and optionally programming input from the input device(s) 114) and provides the output to display 112 for presentation to the user. The robot programming application 116 may also generate robot control output and provide the robot control output to the robot 120. The robot control output generated by the robot programming application 116 is based on the programming input received from the user via the input device(s) 114, one or more parameters of the end effector, and/or other factors.

Figure 3:
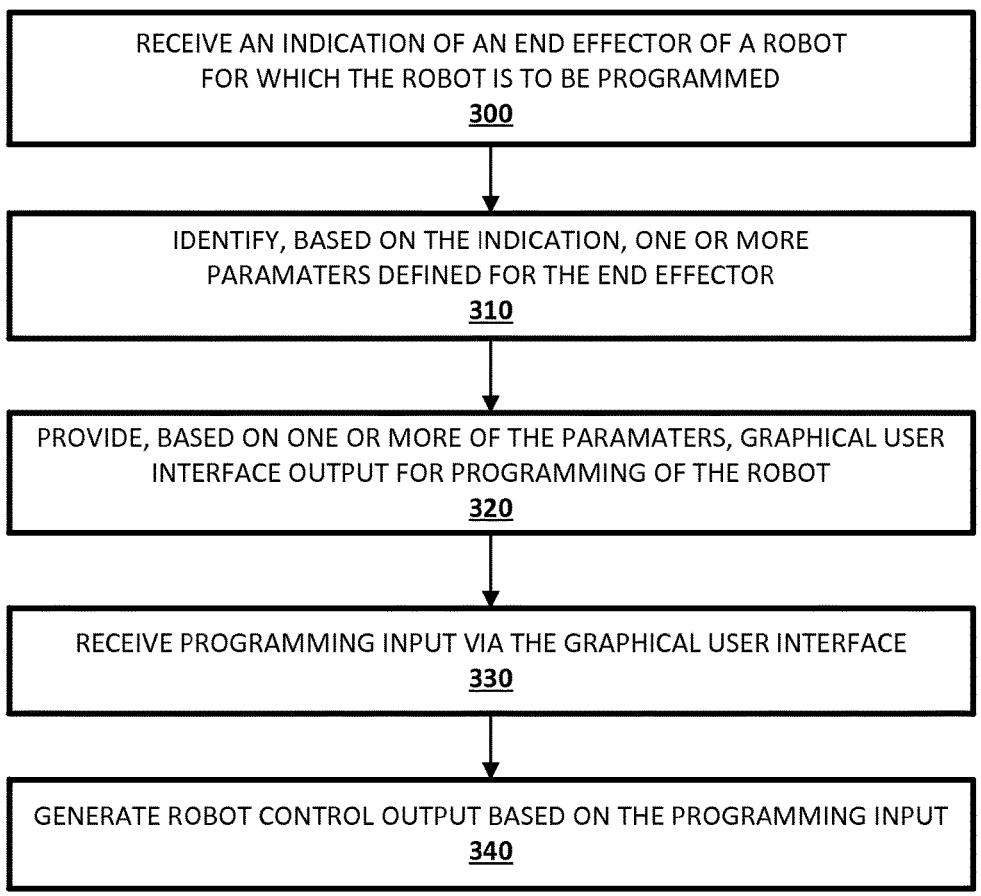
FIG. 3 is a flowchart illustrating an example method of adapting graphical user interface output and robot control output of a robot programming application based on one or more parameters of an end effector.

FIG. 3 is a flowchart illustrating an example method of adapting graphical user interface output and robot control output of a robot programming application based on one or more parameters of an end effector. For convenience, the operations of the flow chart are described with reference to a system that performs the operations. This system may include various components of various computer systems, including robot programming application 116 of computing device 110 and/or one or more components of robot programming application 116 executing on one or more computing devices that are remote from computing device 110. Moreover, while operations of the method of FIG. 3 are shown in a particular order, this is not meant to be limiting. One or more operations may be reordered, omitted or added.

At step 300, the system receives an indication of an end effector of a robot for which the robot is to be programmed. In some implementations, the indication may be an identifier of the end effector received by the system from a robot that has determined the identifier. In some implementations, the indication may be user input that identifies the end effector and is received from one or more input devices. In some implementations, the indication may be a data packet, received by the system from a robot, that comprises one or more of the parameters described below with respect to step 310.

At step 310, the system identifies, based on the indication, one or more parameters defined for the end effector. In some implementations where the indication of step 300 is an identifier of the end effector, the system may identify the parameters based on a mapping between the identifier and the parameters in one or more storage mediums such as end effectors parameters database 160. In some implementations where the indication of step 300 is a data packet that comprises one or more of the parameters, the system may identify the parameters based on the data packet.

At step 320, the system provides, based on one or more of the parameters identified at step 310, GUI output for programming of the robot. For example, the system may determine the GUI output based on the parameters and optionally based on programming input received via one or more input devices, and provide the GUI output to one or more display devices for display to the user. The GUI output may include, for example, one or more of the GUI outputs described above with respect to FIGS. 1 and/or 2A, and/or one or more of the GUI outputs illustrated in FIGS. 4A-4D.

At step 330, the system receives programming input via the graphical user interface. For example, programming input may be provided to the system in response to user interaction with one or more input devices while the user defines tasks for the robot via the GUI. For example, a user may define, via one or more programming inputs to a robot programming application, that a gripper end effector of the robot is to: move to a first area, pick up a first object, move the object along a path to a second area, and place the object in the second area. As described with respect to step 320, in many implementations step 320 may be based on programming input received at step 330. Accordingly, steps 320 and 330 may be reordered and/or may be iteratively performed.

At step 340, the system generates robot control output based on the programming input received at step 330. In some implementations, the system also generates the programming input based on one or more parameters of the end effector, and/or other factors. In some implementations, the one or more parameters of the end effector on which the robot control output is based may include one or more parameters that are in addition to those utilized to adapt the GUI output at step 320. In some implementations, the system waits until the user has indicated completion of programming of a robot before generating the robot control output. The system provides the robot control output to the robot and the robot may utilize the robot control output in generating control commands to provide to one or more actuators and/or other operational components of the robot.

FIGS. 4A, 4B, 4C, and 4D each illustrate an example graphical user interface that has been adapted based on one or more parameters of an end effector 450 for a robot 420 being programmed. The graphical user interfaces of FIGS. 4A-4D may be provided, for example, on display 114 in response to graphical user interface output provided by the robot programming application 116.

Figure 4A:
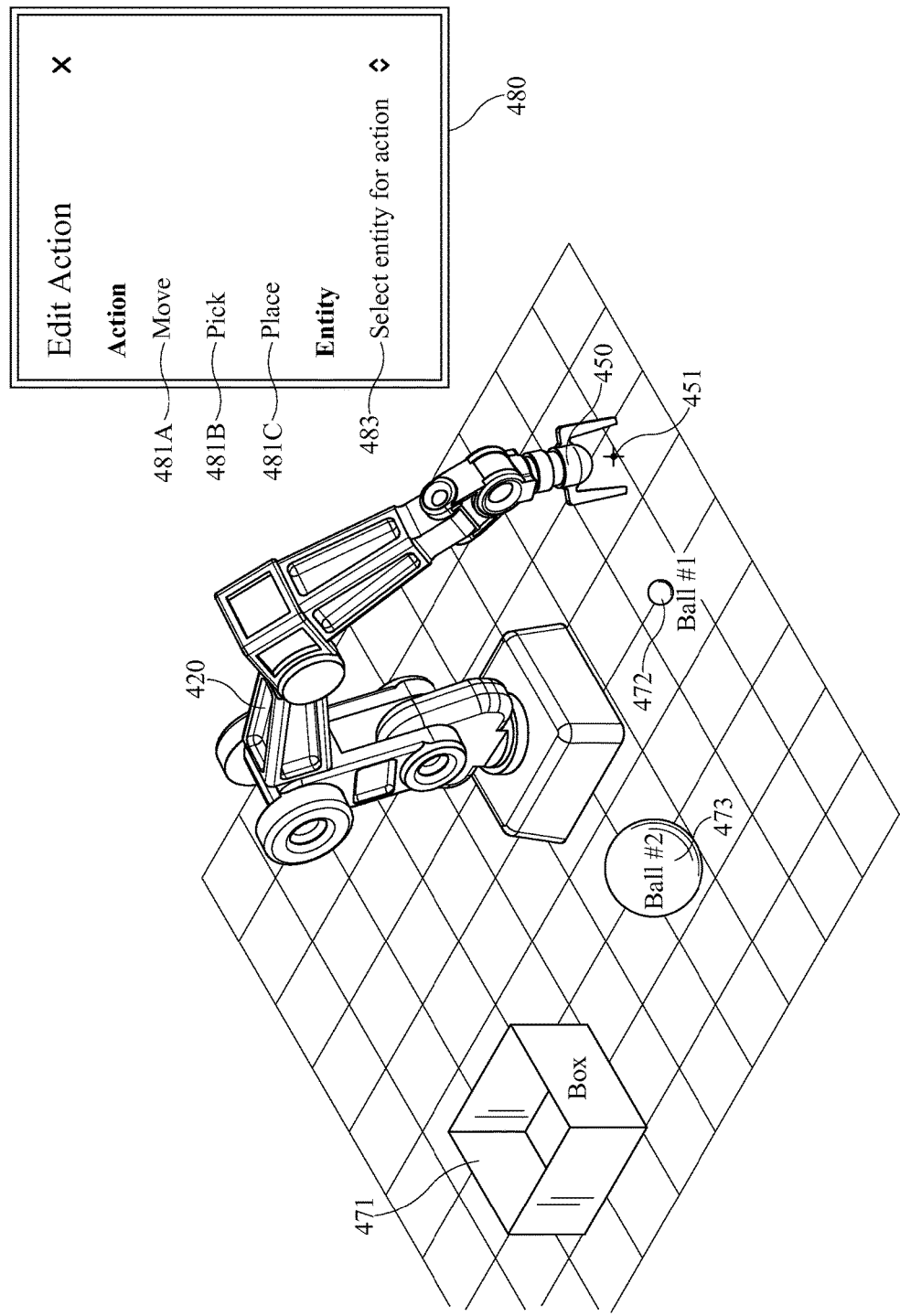
FIGS. 4A, 4B, 4C, and 4D each illustrate an example graphical user interface that has been adapted based on one or more parameters of an end effector for a robot being programmed.
Figure 4B:
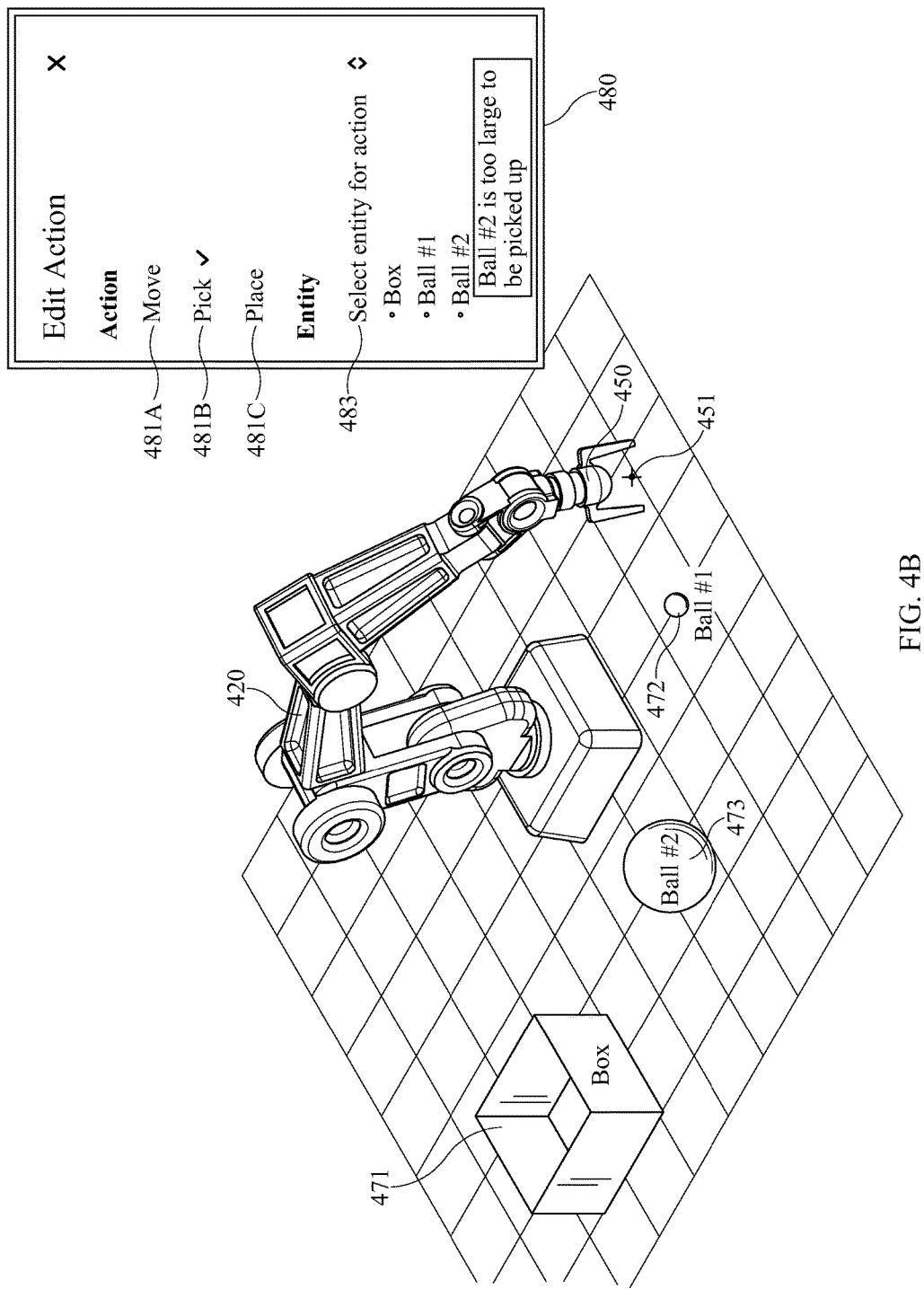

FIG. 4A illustrates a GUI with graphical depictions of a robot 420 with a gripper end effector 450 attached to the robot 420. The GUI further includes graphical depictions of a box 471, a first ball 472, and a second ball 473. The graphical depictions of the robot 420, box 471, first ball 472, and/or second ball 473 may be generated, for example, based on stored 3D models of those components and/or user input via the GUI and/or a separate 3D modeling program. In some implementations, the graphical depiction of the end effector 450 may be generated based on a 3D model and/or other parameters received for the end effector 450 as described herein (e.g., based on one or more techniques described with respect to FIGS. 2A-2C).

An end effector reference point 451 is also illustrated in the GUI of FIG. 4A. The end effector reference point 451 serves as a reference for aiding a user in positioning the end effector 450 relative to an object that is to be picked up by the end effector 450. In other words, it is a graphical depiction that informs a user of where an area to be grasped should be located to enable preferred grasping of the area by the end effector 450. In other implementations, each "claw" of the end effector 450 may additionally and/or alternatively include a graphical depiction of a reference point to illustrate the portion of each claw that should contact an object when the object is picked up—to inform a user of where an area to be grasped should be located to enable preferred grasping of the area by the end effector 450.

In some implementations, the end effector reference point 451 of the GUI may be generated based on an action location parameter received for the end effector as described herein. In some of those implementations, the action location parameter may be in the form of a graphical indication in a 3D model defined for the end effector 450 and/or in the form of a coordinate defined for the end effector 450. Alternative end effectors may have different reference point(s) defined for the end effector. For example, alternative gripper end effectors may have reference points defined to achieve an optimal or otherwise preferred gripping of objects for those end effectors. Also, for example, a magnetic end effector may have a reference point defined at a center of a magnetic surface of the magnetic end effector.

The GUI of FIG. 4A further includes an edit action menu 480 that provides actions that are selectable for the end effector 450, including a move action 481A, a pick action 481B, and a place action 481C. In some implementations, the actions 481A-C may be selected as options for presentation in the edit action menu 480 based on action parameters received for the end effector 450 as described herein. The edit action menu 480 may be provided, for example, responsive to user selection of an "edit action" interface element or other input via the GUI.

The edit action menu 480 further provides an entity selection option 483 that can be selected by the user to provide a list of entities on which a selected action can be performed and/or to allow the user to define new entities. For example, and with reference to FIG. 4B, the user has selected the pick action 481B (as indicated by the check mark in FIG. 4B) and has further selected the entity selection option 483. In response to selecting the entity selection option 483, descriptions of the box 471, first ball 472, and second ball 473 are provided. A notification 484 is further provided that indicates second ball 473 is too large to be picked up by the end effector 450. The GUI may additionally and/or alternatively be adapted to prevent the second ball 473 from being selected as an interaction object for the pick action 481B. In some implementations, the robot programming application may determine the second ball 473 is too large to be picked up by the end effector 450 based on comparing one or more parameters of the second ball 473 to one or more of the parameters received for the end effector 450. For example, parameters that define the gripping width of the end effector 450 in an "open" state, that define size limits on objects that may be interacted with by the end effector, and/or other parameters may be compared to a size (the actual defined size) of the second ball 473 to determine the second ball 473 is too large to be picked up by the end effector 450.

Figure 4C:
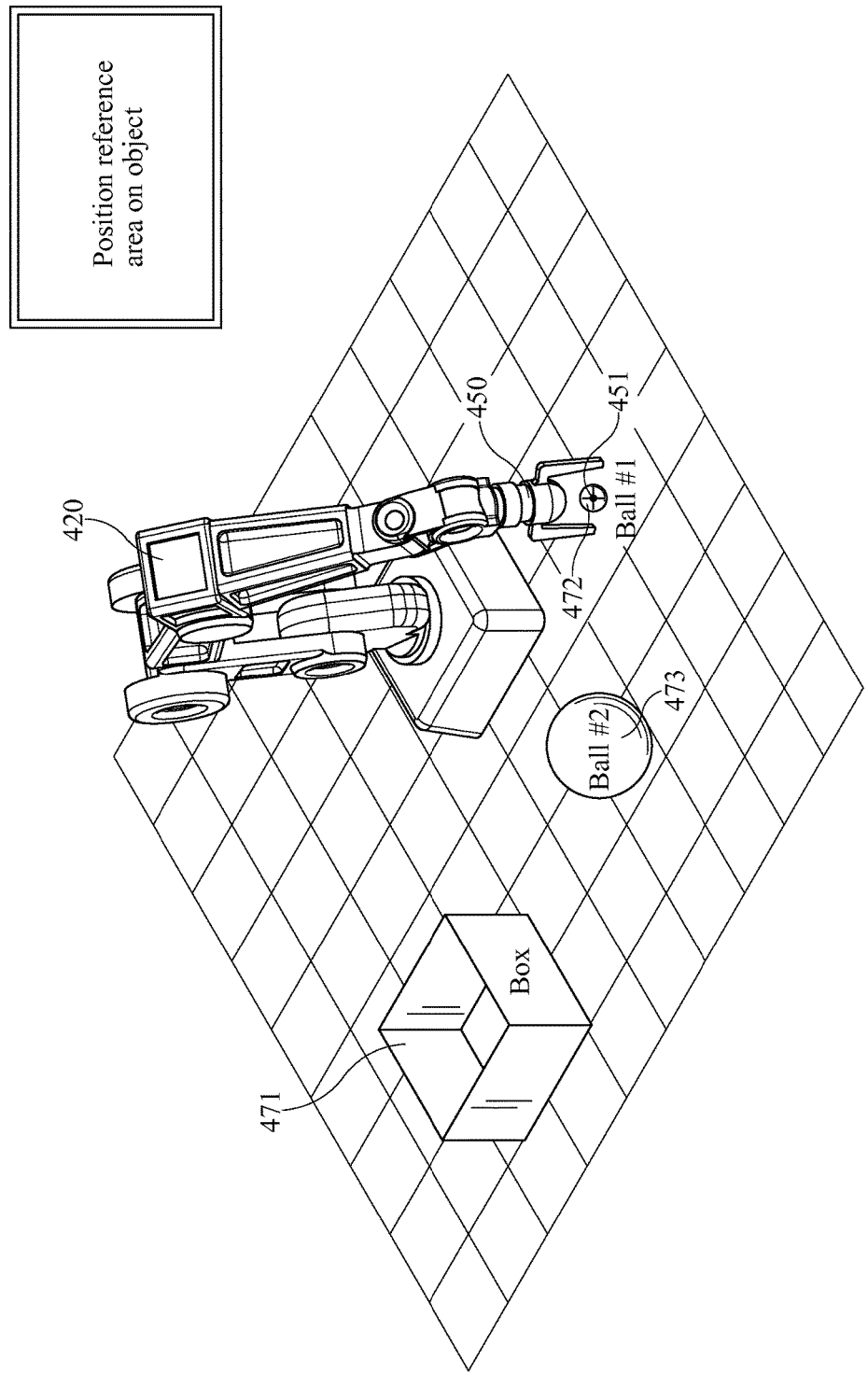

In FIG. 4C, the user is alternatively defining a task of "pick first ball 472" (i.e., the action of "pick" with the interaction entity being the first ball 472) via the GUI. The user has manipulated the robot 420 (e.g., via click/point and drag in the GUI, actual manipulation of the robot 420 that is reflected in the GUI, and/or alternative input) to define a desired pose of the robot when the pick action is performed. The end effector reference point 451 is illustrated in the GUI of FIG. 4C and serves as a reference for aiding the user in positioning the end effector 450.

Figure 4D:
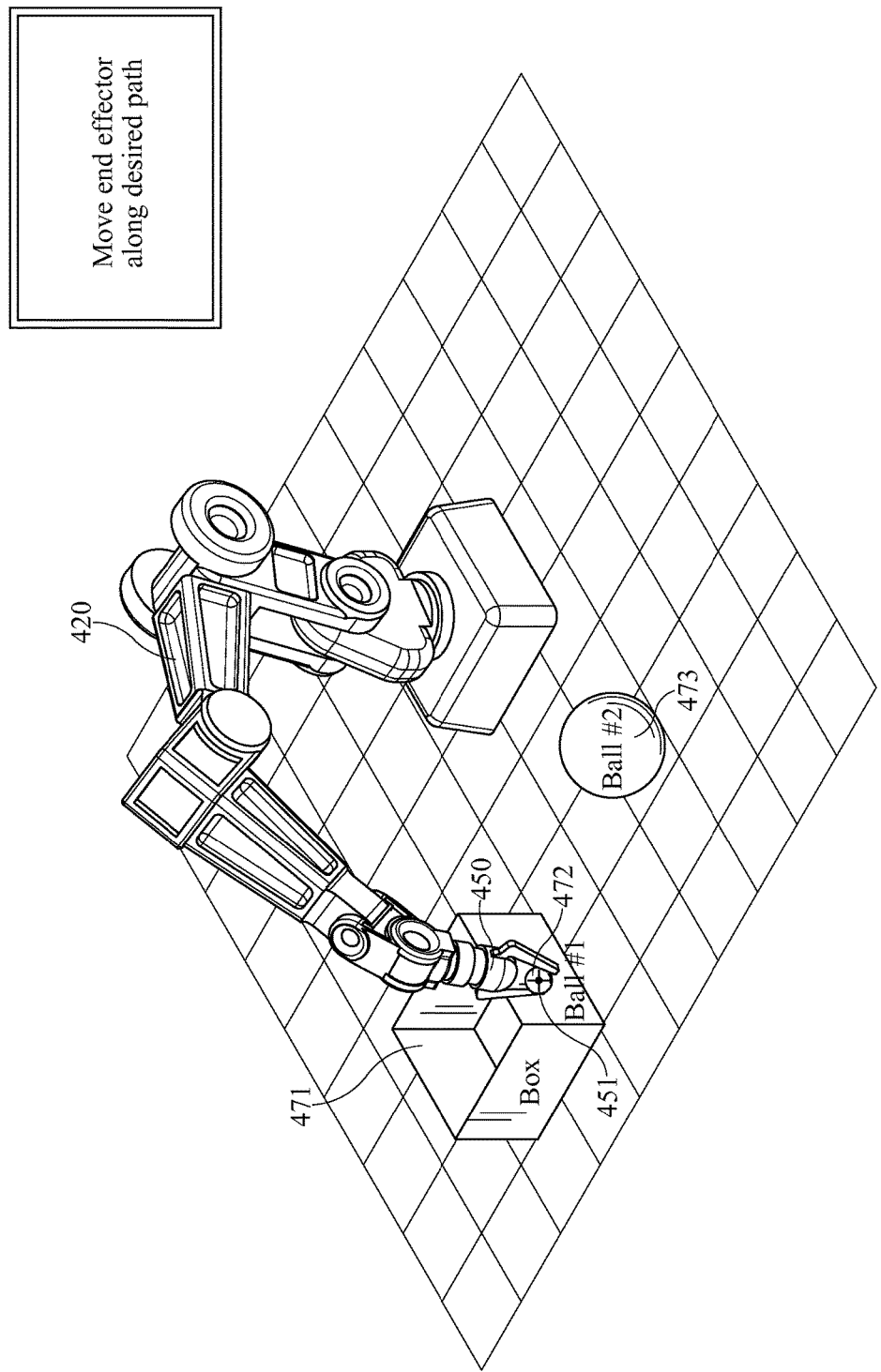

In FIG. 4D, the user is defining a path for a task of "move first ball 472 along a path" task (i.e., the action of "move" with the interaction entity being the path) via the GUI. It is noted that in FIG. 4D, the "claws" of the end effector 450 are illustrated in a second state to reflect the state they will be in when grasping the first ball 472 (as compared to the "open" state of FIGS. 4A-4C). It is further noted that the user defines the path in FIG. 4D based on the second state of the end effector 450. In other words, the defined path may have one or more waypoints that would not undesirably contact an object when the end effector 450 is in the second state illustrated in FIG. 4D, whereas those waypoints would undesirably contact an object when the end effector 450 is in the open state illustrated in FIGS. 4A-4C. For example, the illustrated waypoint of FIG. 4D where the end effector 450 is near the box 471 would actually "contact" the box if the end effector 450 was in the open state illustrated in FIGS. 4A-4C. The graphical representation of the second state of FIG. 4D may be generated and/or restrictions on paths or way points determined based on received parameters for the end effector 450 as described herein, such a 3D model that defines the second state of the end effector 450. Although particular examples of a GUI being adapted based on parameters of an end effector 450 are illustrated in FIGS. 4A-4D, other variations are possible such as, but not limited to, other variations described herein. For example, in some implementations parameters of an end effector may define one or more tasks to be performed by a robot having the end effector such as a task that includes multiple actions, one or more interaction objects, one or more paths, etc. For instance, in some implementations the parameters may define a task of "pick up object, move object along defined path, and drop off object at end of the path" or a more complicated task for assembling a product from multiple discrete components. The tasks may be provided for selection via the GUI and a selected task defined as a task for the robot.

Figure 5A:
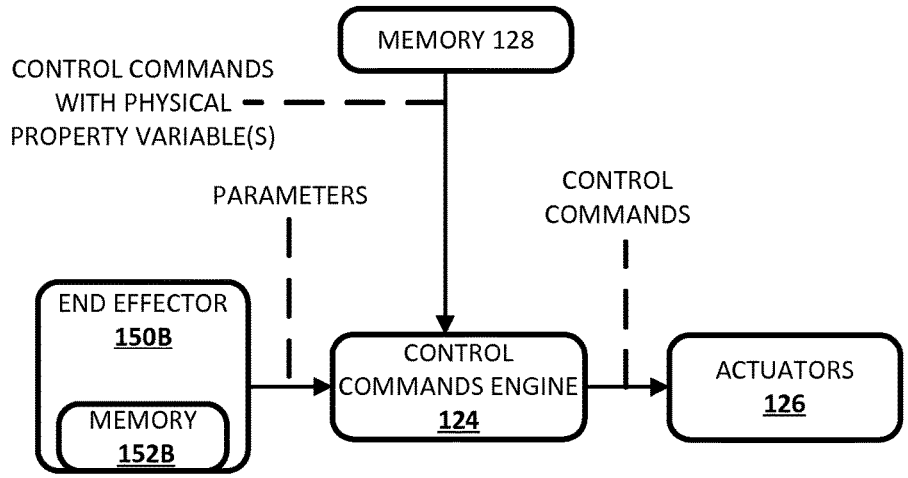
FIGS. 5A and 5B each illustrate an example of a control commands engine of a robot generating control commands based on one or more parameters of an end effector attached to the robot.
Figure 5B:
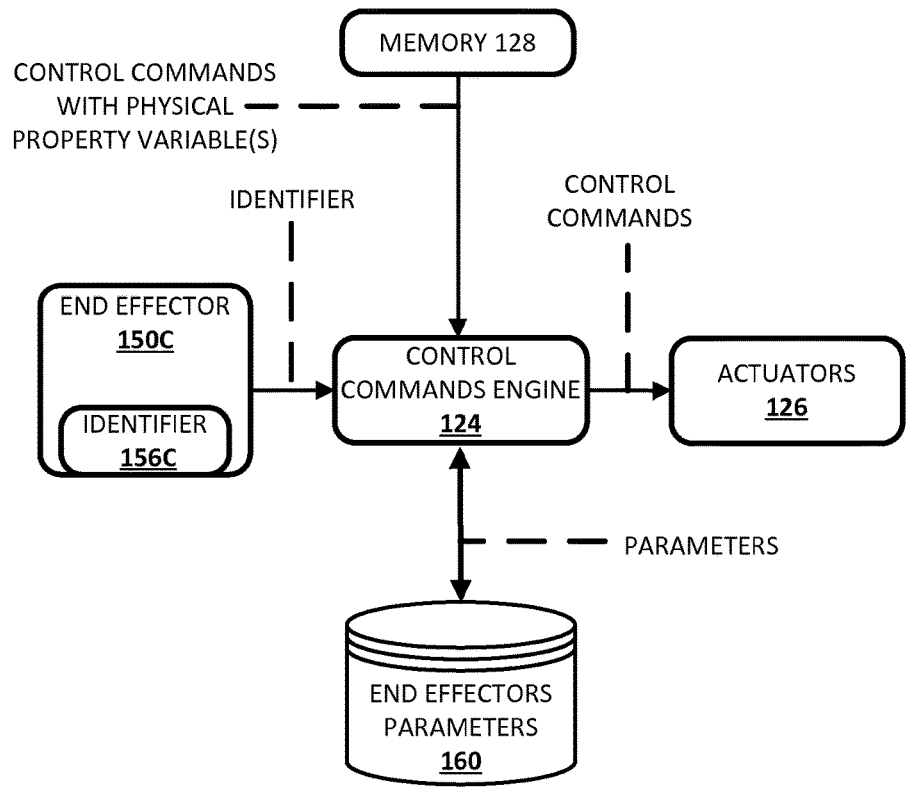

Turning now to FIGS. 5A and 5B, additional description is provided of examples of generating control commands based on one or more parameters of an end effector attached to a robot. In FIG. 5A, control commands engine 124 of robot 120 receives parameters from end effector 150B. For example, the memory 152B of end effector 150B may store the parameters and control commands engine 124 may access the memory 152B via a wired data connection between the robot 120 and the end effector 150B after the end effector 150B is attached to the end effector attachment area 122.

The parameters received from the end effector 150B comprise one or more physical property parameters that define one or more physical properties of the end effector. In some implementations, the physical property parameters include one or more of a mass parameter, a center of mass parameter, an inertia parameter, an action location parameter, an attachment area offset parameter, geometric bound properties that define the outer bounds of the end effector in at least one state of the end effector, to name just a few. As described herein, the action location parameter of an end effector defines at least one reference point for positioning the end effector relative to an object to be acted upon by the end effector. An attachment area offset parameter defines a displacement distance (in one or more axes) for one or more points of the end effector relative to the attachment area of a robot. For example, the attachment area offset parameter of an end effector may define where a reference point of the end effector (defined by an action location parameter) is located relative to a reference point of the attachment area of the robot (e.g., a center of the attachment area). The geometric bound properties of an end effector may define, for each of one or more states of the end effector, an exact 3D model of the outer bounds of the end effector in the respective state, or one or more circles, rectangles, and/or other shapes that approximate the outer bounds of the end effector in the respective state. Additional parameters may be defined for an end effector that are in addition to physical property parameters such as interaction object parameters.

In some implementations, the control commands engine 124 retrieves control commands with physical property variable(s) from memory 128 of the robot 120 (and/or an external storage medium). The control commands engine 124 applies, for each of one or more of the physical property variables of the control commands, one of the physical property parameters as a value for the variable. For example, a control command may be dependent on the mass of the end effector 150B and a mass parameter that defines the mass of the end effector 150B may be utilized by the control commands engine 124 in generating the control command. The control commands engine 124 provides the generated control commands to actuators 126 and/or other operational components to control the robot 120.

In some implementations, applying a physical property parameter as a value for a variable comprises applying the physical property parameter unaltered (i.e., as received from the end effector 150B) as the value. In some other implementations, applying a physical property parameter as a value for a variable comprises determining the value based on the physical property parameter, but the value is altered from the physical property parameter received from the end effector 150B. For example, a unit conversion may be made to the physical property parameter such as a conversion of a mass parameter from pounds to kilograms. Also, for example, the value may be based on a mapping of the physical property parameter to the value. Also, for example, the value of a physical property parameter that defines an action location parameter may be based on adjusting the physical property parameter based on an offset associated with the robot 120. Also, for example, a 3D model of an end effector received as a parameter for the end effector may comprise, or be utilized to determine, a mass parameter, a center of mass parameter, an action location parameter, etc. Additional and/or alternative alterations may be made.

As one example of generating a control command based on a physical property parameter, the control commands engine 124 may determine a path of the end effector based on an action location parameter. For example, the control commands stored in memory 128 may define that the end effector is to traverse a path to position the reference point of the end effector at a particular location at the end of the path. The control commands engine 124 may include a path planner that determines a path for the end effector based on the reference point defined by the action location parameter, so that the reference point of the end effector is at the particular location at the end of the path.

As another example of generating a control command based on a physical property parameter, control commands engine 124 may determine a path of an end effector based on geometric dimensions of a gripper end effector based on a "closed" state of the gripper end effector. For example, the physical properties may comprise geometric bound properties that define the outer bounds of the end effector in a closed state of the end effector and the control commands stored in memory 128 may define that the end effector is to grasp an object, then traverse a path while grasping the object (i.e., traverse the path in the closed state). The control commands engine 124 may include a path planner that determines a path for the end effector based on the outer bounds of the end effector in the closed state of the end effector.

As yet another example of generating a control command based on a physical property parameter, control commands engine 124 may determine control commands to provide to one or more actuators of the robot to traverse the end effector along a defined path a at a defined speed, in view of one or more of the physical property parameters. For example, the control commands engine 124 may determine the control commands in view of an inertia parameter of the end effector. For instance, the torque needed at one or more points along the defined path, to drive a first end effector having a first inertia along the defined path at the defined speed may be vastly different than the torque needed to drive a second end effector having a second inertia along the defined path at the defined speed. In some of those implementations, the torque at any given point along the path may be determined based on applying the physical property parameter as a value for determining the torque. Although particular examples of adapting control commands based on parameters of an end effector are described herein, other variations are possible such as, but not limited to, other variations described herein.

In FIG. 5B, control commands engine 124 receives identifier 156C from end effector 150C, but does not receive parameters for the end effector 150C. The control commands engine 124 utilizes the identifier 156C to determine, from end effectors parameters database 160, parameters that are mapped to the identifier 156C. The identifier 156C may be identified by control commands engine 124 utilizing one or more techniques such as those described with respect to FIGS. 1 and 2B. For example, the identifier 156C may be embedded in an RFID tag or transmitter that is read by an RFID receiver of the robot 120. As with FIG. 5A, the control commands engine 124 generates control commands based on one or more of the received parameters and the control commands with physical property variables of memory 128.

Figure 6:
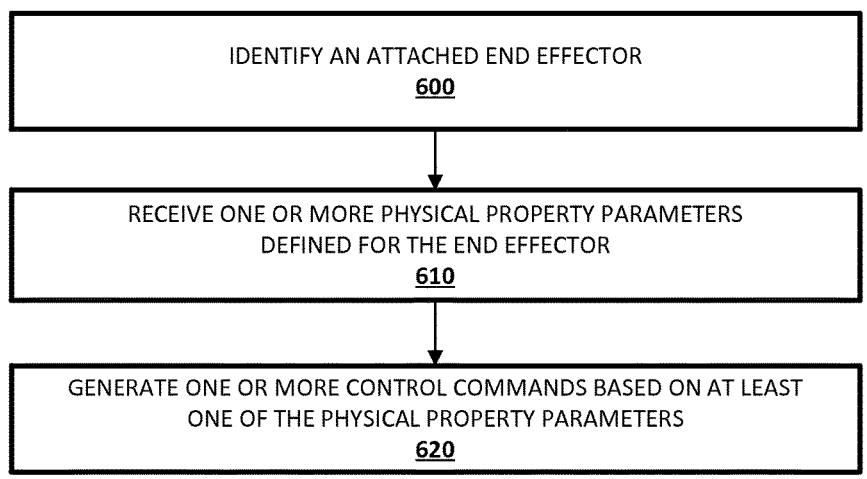
FIG. 6 is a flowchart illustrating an example method of generating control commands based on one or more parameters of an attached end effector.

FIG. 6 is a flowchart illustrating an example method of generating control commands based on one or more parameters of an attached end effector. For convenience, the operations of the flow chart are described with reference to a system that performs the operations. This system may include various components of various computer systems, including control commands engine 124 of robot 120 and/or one or more components of control commands engine 124 executing on one or more computing devices that are remote from robot 120. Moreover, while operations of the method of FIG. 6 are shown in a particular order, this is not meant to be limiting. One or more operations may be reordered, omitted or added.

At step 600, the system identifies an attached end effector. In some implementations, identifying the attached end effector may comprise identifying the end effector is coupled to a data and/or power connection of end effector attachment area 122. In some implementations, identifying the attached end effector may comprise receiving an identifier of the end effector following attachment of the end effector to the end effector attachment area 122. In some of those implementations, the identifier may be received via a wired or wireless communication connection between the system and the end effector. In some other implementations, the identifier may be received by capturing one or more images of the end effector with a camera of the system. In some implementations, the indication may be a data packet, received by the robot from the end effector, that comprises one or more of the parameters described below with respect to step 610

At step 610, the system receives one or more physical property parameters defined for the attached end effector. In some implementations where the indication of step 600 is an identifier of the end effector, the system may identify the parameters based on a mapping between the identifier and the parameters in one or more storage mediums such as end effectors parameters database 160. In some implementations where the indication of step 600 is a data packet that comprises one or more of the parameters, the system may identify the parameters based on the data packet.

At step 620, the system generates one or more control commands based on at least one of the physical property parameters. In some implementations, the system retrieves control commands with physical property variable(s) and generates the control commands by applying, for each of one or more of the physical property variables of the control commands, one of the physical property parameters as a value for the variable. For example, a control command may be dependent on the mass of the end and a mass parameter that defines the mass of the end effector may be utilized by the system in generating the control command.

In some implementations, an end effector may be manually adjustable to a plurality of hardware configurations and programming of a robot may be adapted (e.g., by programming application 116) and/or control of the robot may be adapted (e.g., by control commands engine 124) based on a current hardware configuration of the end effector. One example of an end effector that is manually adjustable to a plurality of hardware configurations is illustrated in FIGS. 7A-7C.

Figure 7A:
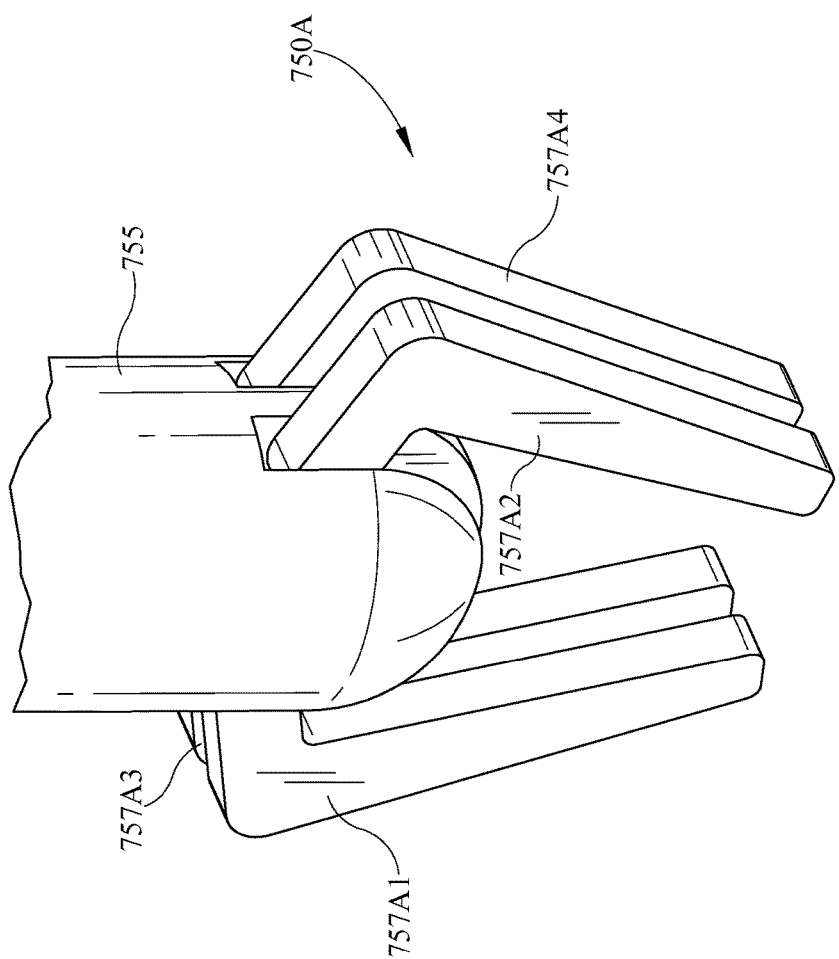
FIG. 7A illustrates an example end effector, in a first hardware configuration, that is manually adjustable to a plurality of hardware configurations.

FIG. 7A illustrates an example end effector in a first hardware configuration 750A. The end effector in the first hardware configuration 750A has a base 755 and four claws 757A1, 757A2, 757A3, and 757A4. In FIG. 7A, the four claws 757A1-A4 are illustrated in an open state. In a closed state, the claws 757A1 and 757A2 may be moved closer to one another and the claws 757A3 and 757A4 may be moved closed to one another.

Figure 7B:
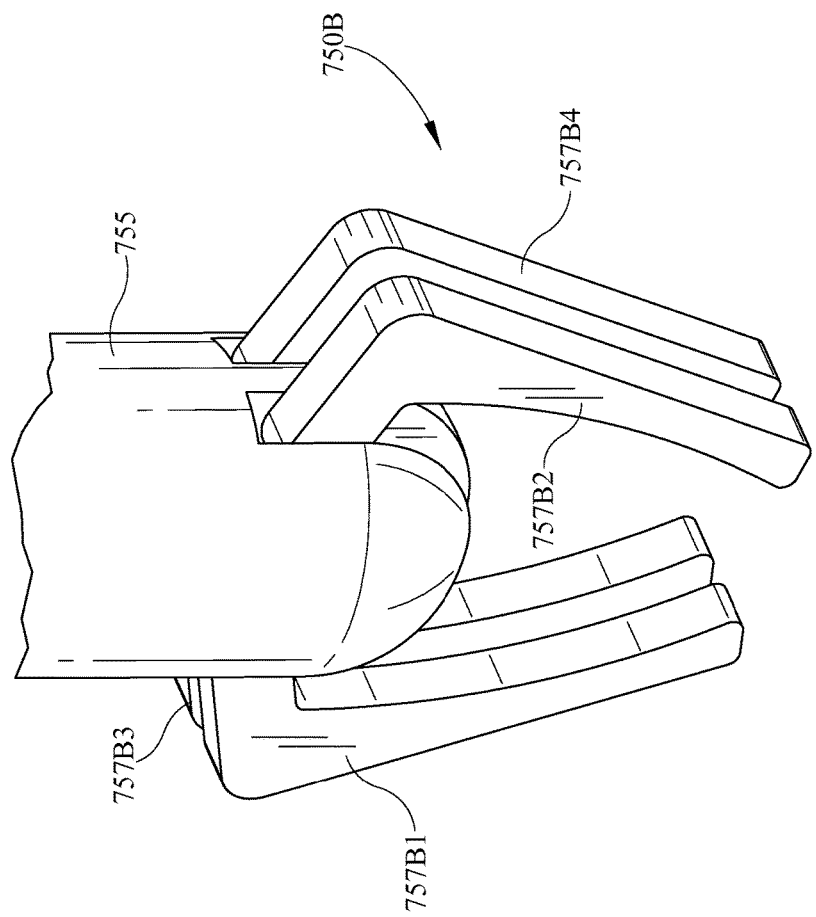
FIG. 7B illustrates the example end effector of FIG. 7A in a second hardware configuration.

FIG. 7B illustrates the example end effector of FIG. 7A in a second hardware configuration 750B. In FIG. 7B the claws 757A1-A4 have been removed from the base 755 by a user and replaced by the user with four alternative claws 757B1, 757B2, 757B3, and 7575B4. The claws 757B1-B4 may be better suited, for example, to picking up cylindrical or circular objects than the claws 757A1-A4 of FIG. 7A. In FIG. 7B, the four claws 757B1-B4 are illustrated in an open state. In a closed state, the claws 757B1 and 757B2 may be moved closer to one another and the claws 757B3 and 757B4 may be moved closed to one another.

Figure 7C:
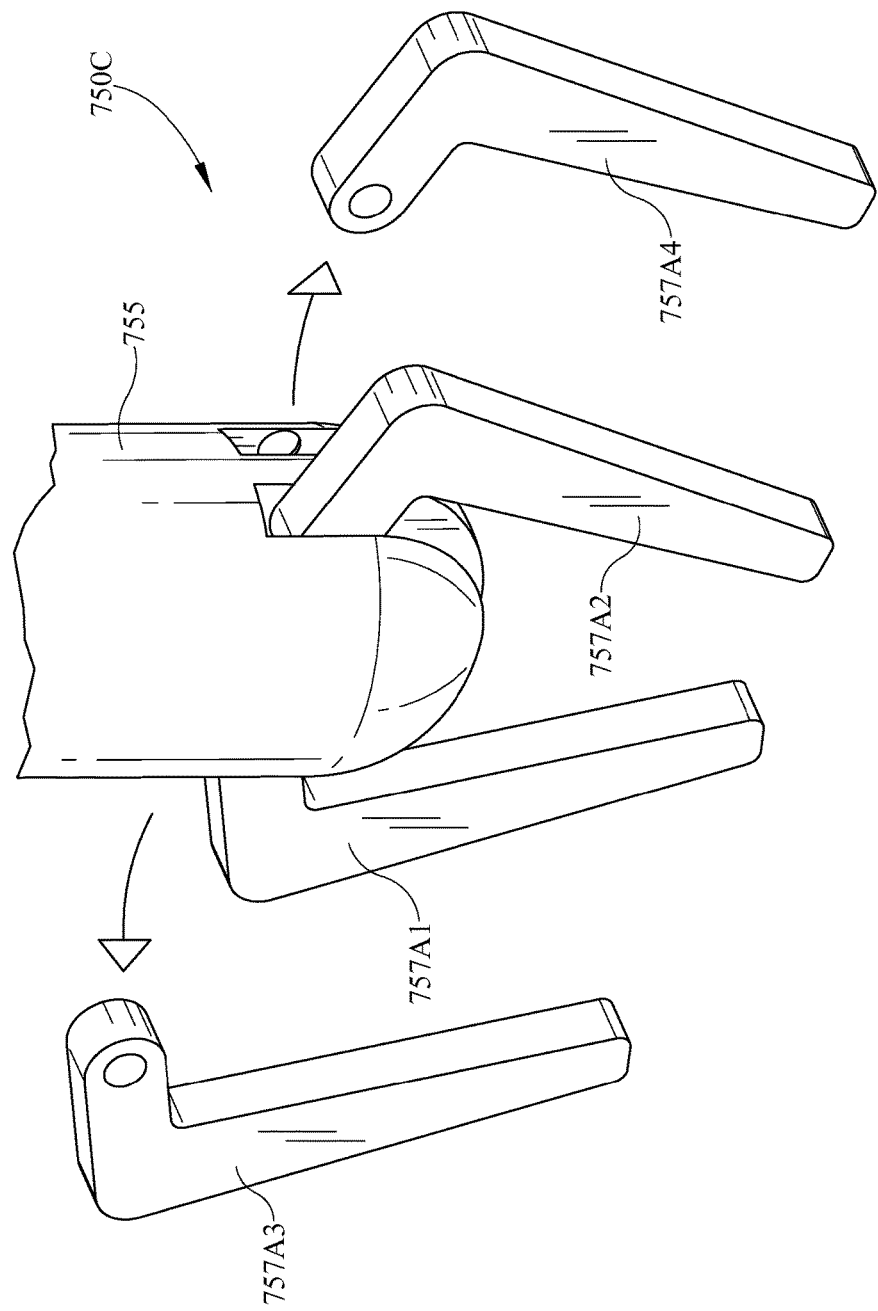
FIG. 7C illustrate the example end effector of FIG. 7A in a third hardware configuration.

FIG. 7C illustrates the example end effector of FIG. 7A in a third hardware configuration 750C. In FIG. 7C the claws 757A3 and 757A4 have been removed from the base 755 by a user, leaving only claws 757A1 and 757A2. In FIG. 7C, the two claws 757A1 and 757A2 are illustrated in an open state. In a closed state, the claws 757A1 and 757A2 may be moved closer to one another.

Each of the configurations of FIGS. 7A-7C may have parameters with values that are different than the values for other of the configurations. For example, the action location parameter for the end effector in the first hardware configuration 750A may be different than the action location parameter for the end effector in the third hardware configuration 750C. Also, for example, parameters defining the 3D model and/or geometric dimensions for each of the configurations will be different. As yet another example, the mass and center of mass parameters for the end effector in the first hardware configuration 750A may be different than the mass and center of mass parameters for the end effector in the third hardware configuration 750C.

In some implementations, the parameters for the particular configuration may be determined by the control commands engine 124 and/or the robot programming application 116 based on input received from the end effector. For example, in some implementations, the base 755 may include a controller that receives indications of which claws are attached and, based on the indications, provides parameters to the robot 120 that are particularized to those claws. For example, each of the claws may include an RFID tag with an identifier of the claw and the base 755 may include an RFID reader to read the RFID tags. The controller of the base 755 may determine parameters particularized to a configuration based on the read RFID tags. For example, parameters for the first configuration may be mapped to identifiers of the four claws 757A1-A4 of FIG. 7A, parameters for the second configuration may be mapped to identifiers of the four claws 757B1-B4 of FIG. 7B, and parameters for the third configuration may be mapped to identifiers of the two claws 757A1 and 757A2 of FIG. 7C (without identification of the claws 757A3 and 757A4). As another example, each of the claws may include memory that identifies the claws and has a communication connection to the controller of the base 755. The controller may access the memories to determine the identifiers and determine parameters that are mapped to the identifiers of the attached claws. As another example, each of the claws may have connection(s) to the controller of the base 755, with voltages or other values of the connection(s) identifying the claws. The controller may determine parameters that are mapped to the values of the attached claws. As yet another example, the controller of the base 755 may provide identifiers of the attached claws (e.g., obtained via RFID, memory, connection(s)) to the control commands engine 124 and/or the robot programming application 116 and they may access end effectors parameters database 160 to identify parameters mapped to the identifiers.

As yet another example, the control commands engine 124 may determine the identifiers directly from the attached claws and access end effectors parameters database 160 to identify parameters mapped to the identifiers (and/or forward the identifiers to programming application 116). For instance, the robot 120 may include an RFID reader to read RFID tags of the claws, may read memory of the claws, and/or may read other values via connection(s) to the claws, and determine parameters that are mapped to the values of the attached claws via the end effectors parameters database 160 (and/or forward the identifiers to programming application 116).

In some implementations, the robot 120 may utilize one or more cameras and/or other sensors to determine features of the attached claws and utilize the features to locate parameters mapped to the features in end effectors parameters database 160. For example, one or more of the claws 757B1-B4 may include a barcode, quick response (QR) code, serial number, or other visual identifier on an exterior surface that may be read by a camera or other optical device of the robot 120. The control commands engine 124 may utilize the visual identifier to determine parameters mapped to the visual identifier in end effectors parameters database 160 (and/or forward the identifier to programming application 116). Also, for example, the robot 120 may include a camera and an image processing engine that processes images taken by the camera and extracts one or more features from the images. The camera may be utilized to take one or more images of the end effector, optionally after moving the end effector to a desired position relative to the camera, and feature(s) extracted from the images by the image processing engine. The robot 120 may utilize one or more of those features to locate parameters mapped to the features in end effectors parameters database 160. In some implementations, the computing device 110 may likewise utilize one or more cameras and/or other sensors to determine external features of the end effector and use the features to locate parameters mapped to the features in end effectors parameters database 160.

In some implementations, a user may utilize computing device 110 to select, from images of a plurality of end effector configurations, an end effector configuration that matches the current configuration of the end effector. The computing device 110 may utilize an identifier associated with the selection to locate parameters mapped to the identifier in end effectors parameters database 160. The located parameters may be utilized by the robot programming application 116 and/or forwarded to the robot 120 for use by the control commands engine 124.

Figure 8:
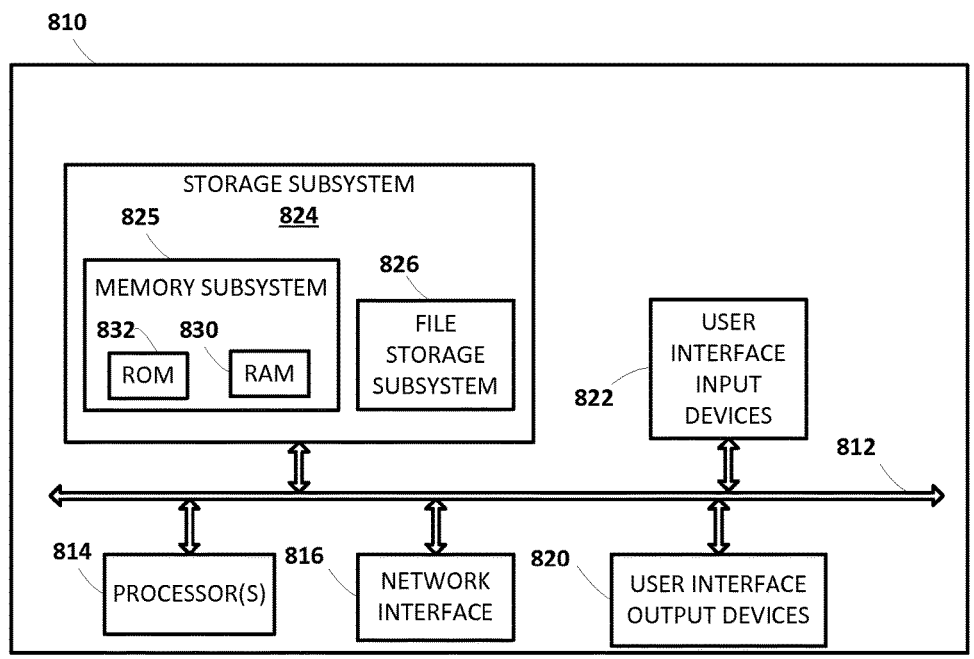
FIG. 8 illustrates an example architecture of a computing device.

FIG. 8 is a block diagram of an example computing device 810. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method of FIGS. 3 and/or 6 and/or to implement one or more aspects of robot programming application 116 and/or control commands engine 124.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
    receiving, by a robot programming application executing on at least one computing device, an indication of an end effector of a robot for which the robot is to be programmed by a user via the programming application,
        the end effector being one of multiple end effectors that can be attached to and detached from an end effector attachment area of the robot;
    identifying, by the programming application and based on the indication, one or more parameters defined for the end effector;
    preventing, by the programming application, particular object programming input from being defined, by the user for the robot, via the programming application,
        wherein the particular object programming input causes robot control output to be generated by the programming application that results in interaction of the end effector with a particular object graphically represented by the programming application, and
        wherein preventing the particular object programming input from being defined is based on comparing at least one object parameter of the particular object to at least one of the parameters defined for the end effector.

2. The method of claim 1, wherein the at least one object parameter compared to the at least one of the parameters defined for the end effector comprises dimensions of the object.

3. The method of claim 1, wherein the at least one object parameter compared to the at least one of the parameters defined for the end effector comprises a weight of the object.

4. The method of claim 1, wherein the at least one object parameter compared to the at least one of the parameters defined for the end effector comprises a type of material of the object.

5. The method of claim 1, wherein the indication of the end effector comprises a unique identifier of the end effector and wherein identifying the parameters comprises:
    selecting the parameters based on a mapping between the parameters and the unique identifier.

6. The method of claim 5, wherein receiving the indication of the end effector comprises receiving input provided by the user via the programming application.

7. The method of claim 1, wherein identifying the parameters defined for the end effector comprises:
    receiving the parameters from the robot following receipt by the robot of the parameters from the end effector.

8. The method of claim 6, wherein receiving the indication comprises receiving, from the robot, a data packet that comprises the parameters.

9. A method implemented by one or more processors, comprising:
    determining that an end effector is attached to a robot in a first hardware configuration of a plurality of hardware configurations of the end effector, wherein the end effector is one of multiple end effectors that can be attached to and detached from an end effector attachment area of the robot, and wherein the plurality of hardware configurations of the end effector include:

the first configuration where a given appendage is attached to the end effector, and a second configuration where the given appendage is not attached to the end effector;

identifying a first parameter that is particularized to the first hardware configuration;

generating, based on the first parameter, one or more control commands to provide to one or more actuators of the robot, wherein the control commands are generated based on the first parameter based on the first parameter being particularized to the first hardware configuration and based on determining that the end effector is attached to the robot in the first hardware configuration.

10. The method of claim 9, wherein the first parameter is one of: a mass parameter, a center of mass parameter, and an inertia parameter.

11. The method of claim 9, wherein the end effector is a gripper and the given appendage is a claw.

12. The method of claim 9, wherein determining that the end effector is attached to the robot in the first hardware configuration comprises determining that the end effector is in the first hardware configuration based on input received by the robot from the end effector.

13. The method of claim 12, wherein in the first hardware configuration the given appendage is attached to the end effector and an additional appendage is attached to the end effector, wherein the input comprises a first identifier corresponding to the given appendage and a second identifier corresponding to the additional appendage, and wherein determining that the end effector is in the first hardware configuration is based on the first identifier and the second identifier.

14. The method of claim 9, wherein determining that the end effector is attached to the robot in the first hardware configuration comprises:

capturing an image of the end effector with a camera of the robot; and determining that the end effector is attached to the robot in the first hardware configuration based on the image.

15. The method of claim 9, wherein generating a given control command of the control commands comprises applying the first parameter as a value for a variable utilized in generating the given control command.

* * * * *